US009661641B2

(12) United States Patent
Su et al.

(10) Patent No.: US 9,661,641 B2
(45) Date of Patent: May 23, 2017

(54) PHYSICAL CELL IDENTIFIER CONFIGURATION METHOD, LOGIC ROOT SEQUENCE INDEX CONFIGURATION METHOD, AND BASE STATION DEVICE

(71) Applicant: Huawei Technologies Co., Ltd., Shenzhen, Guangdong (CN)

(72) Inventors: Wei Su, Shanghai (CN); Xiu Wu, Chengdu (CN); Haigang Fang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 318 days.

(21) Appl. No.: 14/458,979

(22) Filed: Aug. 13, 2014

(65) Prior Publication Data

US 2014/0348121 A1 Nov. 27, 2014

Related U.S. Application Data

(63) Continuation of application No. PCT/CN2013/071774, filed on Feb. 22, 2013.

(30) Foreign Application Priority Data

Feb. 24, 2012 (CN) .......................... 2012 1 0043556

(51) Int. Cl.
*H04W 72/08* (2009.01)
*H04W 16/10* (2009.01)
*H04W 74/08* (2009.01)

(52) U.S. Cl.
CPC ......... *H04W 72/082* (2013.01); *H04W 16/10* (2013.01); *H04W 74/0833* (2013.01)

(58) Field of Classification Search
CPC ... H04W 74/004; H04W 92/20; H04W 16/10; H04W 36/08; H04W 72/082; H04W 16/02; H04W 74/0833
See application file for complete search history.

(56) References Cited

U.S. PATENT DOCUMENTS

2009/0180566 A1* 7/2009 Kimura ............ H04L 25/03343 375/265
2009/0252245 A1* 10/2009 Zhang .............. H04L 25/03159 375/260

(Continued)

FOREIGN PATENT DOCUMENTS

CN 101784122 A 7/2010
CN 101820301 A 9/2010

(Continued)

OTHER PUBLICATIONS

3GPP TS 32.521 V10.1.0 (Dec. 2010), titled 3rd Generation Partnership Project; Technical Specification Group Services and System Aspects; Telecommunication Management; Self-Organizing Networks (SON) Policy Network Resource Model (NRM) Integration Reference Point (IRP); Requirements (Release 10) was published Dec. 2010.*

(Continued)

*Primary Examiner* — Andrew Lai
*Assistant Examiner* — Hoyet H Andrews
(74) *Attorney, Agent, or Firm* — Leydig, Voit & Mayer, Ltd.

(57) ABSTRACT

The present invention discloses a physical cell identifier configuration method, a logic root sequence index configuration method, and a base station, so as to decrease a false random access alarm.

16 Claims, 6 Drawing Sheets

Start

201 Import an LRSI list of a neighboring cell and traverse the LRSI list of the neighboring cell to generate an LRSI occupancy table LRSI_MASK 202 Sequentially search the LRSI occupancy table LRSI_MASK for P continuous LRSIs that are not occupied by the neighboring cell and obtains each LRSI among the P continuous LRSIs that are not occupied by the neighboring cell 203 Use each LRSI among the P continuous LRSIs that are not occupied by the neighboring cell as a lookup parameter and finds interference coefficients corresponding to each LRSI from a preset interference coefficient table 204 Does an interference coefficient that is greater than an interference coefficient threshold exist among all interference coefficients corresponding to the P continuous LRSIs that are not occupied by the neighboring cell?

Yes / No

205 Calculate and record a cumulative sum of all the interference coefficients corresponding to the P continuous LRSIs that are not occupied by the neighboring cell 206 Is the LRSI occupancy table searched completely?

No / Yes

207 Output a first LRSI among P continuous LRSIs that are not occupied by the neighboring cell and correspond to a minimum cumulative sum as an initial LRSI of the serving cell 208 Output a first LRSI among the P continuous LRSIs that are not occupied by the neighboring cell as an initial LRSI of the serving cell, and end this procedure End

(56) References Cited

U.S. PATENT DOCUMENTS

| | | | | |
|---|---|---|---|---|
| 2010/0158173 A1* | 6/2010 | Lee | H04L 25/0212 375/346 |
| 2010/0284303 A1* | 11/2010 | Catovic | H04W 24/02 370/254 |
| 2012/0045995 A1* | 2/2012 | Nakano | H04J 11/0036 455/63.1 |

FOREIGN PATENT DOCUMENTS

| | | | |
|---|---|---|---|
| CN | 101888622 | A | 11/2010 |
| CN | 101998646 | A | 3/2011 |
| CN | 102281542 | A | 12/2011 |
| WO | 2008114983 | A2 | 9/2008 |

OTHER PUBLICATIONS

3GPP TS 36.902 V9.3.1 (Mar. 2011), titled 3rd Generation Partnership Project; Technical Specification Group Radio Access Network; Evolved Universal Terrestrial Radio Access Network (E-UTRAN); Self-configuring and self-optimizing network (SON) use cases and solutions (Release 9) was published Mar. 2011.*

3GPP TS 36.300 V10.6.0 (Dec. 2011), titled 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) was published Dec. 2011.*

3GPP TS 36.211 V10.4.0 (Dec. 2011), titled 3rd Generation Partnership Project; Technical Specification Group Radio Access Network; Evolved Universal Terrestrial Radio Access (E-UTRA); Physical Channels and Modulation (Release 10) was published Dec. 2011.*

Amirijoo et al., titled "Neighbor Cell Relation List and Physical Cell Identity Self-Organization in LTE", (Amirijoo hereinafter) was published as ICC Workshops—2008 IEEE International Conference on Communications Workshops, Beijing, 2008, pp. 37-41. doi: 10.1109/ICCW.2008.12.*

3GPP TSG RAN WG3#65 R3-091692, titled Root Sequence Index information for RACHO (R3-091692 hereinafter) was published as Agenda Item 10.3, 3GPP TSG RAN WG3#65, pp. 01-03.*

Yuping Zhao et al., titled Intercarrier Interference Self-Cancellation Scheme for OFDM Mobile Communication Systems (ZHAO hereinafter) in IEEE Transactions on Communications, vol. 49, No. 7, pp. 1185-1191, Jul. 2001; doi: 10.1109/26.935159.*

J. Salo, M. Nur-Alam, K. Chang, titled Practical Introduction to LTE Radio Planning (SALO hereinafter) was published as White Paper, European Communications Engineering (ECE) Ltd., Finland (2010), pp. 01-20.*

M. Amirijoo, P. Frenger, F. Gunnarsson, H. Kallin, J. Moe and K. Zetterberg, (hereinafter Amirijoo) "Neighbor Cell Relation List and Physical Cell Identity Self-Organization in LTE," ICC Workshops—2008 IEEE International Conference on Communications Workshops, Beijing, 2008, pp. 37-41, doi: 10.1109/ICCW.2008.12.*

* cited by examiner

PHYSICAL CELL IDENTIFIER CONFIGURATION METHOD, LOGIC ROOT SEQUENCE INDEX CONFIGURATION METHOD, AND BASE STATION DEVICE

CROSS-REFERENCE TO RELATED APPLICATION

This application is a continuation of International Patent Application No. PCT/CN2013/071774, filed on Feb. 22, 2013, which claims priority to Chinese Patent Application No. 201210043556.X, filed on Feb. 24, 2012, both of which are hereby incorporated by reference in their entireties.

TECHNICAL FIELD

The present invention relates to the field of communications technologies, and in particular, to a physical cell identifier configuration method, a logic root sequence index configuration method, and a base station device, and is applied to a long term evolution (Long Term Evolution, LTE) system.

BACKGROUND

In an LTE system, in order to improve spectrum efficiency, an intra-frequency networking manner is generally adopted, that is, a frequency is completely reused between neighboring cells. In the intra-frequency networking manner, strong interference exists between neighboring cells, which presents a challenge for uplink channel receiving of a base station. How to better suppress interference between neighboring cells to improve system performance is a hot spot of research in this field.

In the LTE system, four uplink channels are defined: a physical uplink shared channel (Physical Uplink Shared Channel, PUSCH), a physical uplink control channel (Physical Uplink Control Channel, PUCCH), a physical random access channel (Physical Random Access Channel, PRACH), and a sounding reference signal (Sounding Reference Signal, SRS). The PUSCH is used for uplink transmission of data, the PUCCH is used for uplink transmission of signaling, the PRACH is used for random access of a user equipment (User Equipment, UE), and the SRS is used for measuring uplink channel information. At present, many mature researches on suppression of interference among PUSCHs, PUCCHs, and SRSs of neighboring cells exist in the industry. For example, it is specified in a protocol that all of the foregoing three channels may be generated or scrambled by a physical cell identifier (Physical cell ID, PCI), and interference may be randomized by reasonably planning PCIs of neighboring cells. However, a few researches on suppression of interference between the PRACH and the three channels: the PUSCH, the PUCCH, and the SRS exist in the industry. A signal sent by a UE on the PRACH is called a preamble sequence (Preamble Sequence, Preamble). The preamble sequence is a Zadoff-Chu sequence (referred to as a ZC sequence), and its length is 839 points. The number of preamble sequences may be 838. The preamble sequence is also called a root sequence (Root Sequence, RS). Different preamble sequences are decided by different root sequence indexes (Root Sequence Index, RSI) and a value range of the RSI may be 1 to 838. In the protocol, according to characteristics of different RSs, RSIs may be rearranged. The rearranged RSIs become logic root sequence indexes (Logic Root Sequence Index, LRSI), where numbers of the logic root sequence indexes may be 0 to 837.

It is found through simulation that, when a PCI of a neighboring cell and an LRSI of a serving cell satisfy a relation: IN (PCI, LRSI)>1 (IN (PCI, LRSI) represents an interference coefficient of an SRS of the neighboring cell for detection of a PRACH of the serving cell, and 1 represents an interference coefficient threshold), the influence of the SRS of the neighboring cell on the detection of the PRACH of the serving cell is relatively large, which easily causes false detection of random access of a base station, thereby causing a false random access alarm.

SUMMARY

Embodiments of the present invention provide a physical cell identifier configuration method, a logic root sequence index configuration method, and a base station, so as to decrease a false random access alarm.

In one aspect, an embodiment of the present invention provides a logic root sequence index configuration method, including:

sequentially searching a logic root sequence index occupancy table for several logic root sequence indexes that are not occupied by a neighboring cell;

using each logic root sequence index among the several logic root sequence indexes that are not occupied by the neighboring cell as a lookup parameter, and finding several interference coefficients corresponding to each logic root sequence index from a preset interference coefficient table, where an interference coefficient of a sounding reference signal of the neighboring cell for detection of a physical random access channel of a serving cell under a condition that a physical cell identifier of the neighboring cell and each logic root sequence index are given is recorded in the interference coefficient table; and if none of interference coefficients corresponding to the several logic root sequence indexes that are not occupied by the neighboring cell is greater than an interference coefficient threshold, outputting a first logic root sequence index among the several logic root sequence indexes that are not occupied by the neighboring cell as an initial logic root sequence index of the serving cell, where the several logic root sequence indexes that are not occupied by the neighboring cell are several continuous logic root sequence indexes that are not occupied by the neighboring cell, where the number of the several continuous logic root sequence indexes that are not occupied by the neighboring cell is the same as the number of root sequences of the serving cell.

In one aspect, an embodiment of the present invention provides a physical cell identifier configuration method, including:

sequentially searching a physical cell identifier occupancy table for a physical cell identifier that is not occupied by a neighboring cell;

using the physical cell identifier that is not occupied by the neighboring cell as a lookup parameter, and finding several interference coefficients corresponding to the physical cell identifier that is not occupied by the neighboring cell from a preset interference coefficient table, where an interference coefficient of a sounding reference signal of a serving cell for detection of a physical random access channel of the neighboring cell under a condition that a logic root sequence index of the neighboring cell and the physical cell identifier that is not occupied by the neighboring cell are given is recorded in the interference coefficient table; and if none of the found interference coefficients corresponding to the physical cell identifier that is not occupied by the neighboring cell is greater than an interference coefficient threshold, outputting the physical cell identifier that is not occupied by the neighboring cell as a physical cell identifier of the serving cell.

In another aspect, an embodiment of the present invention provides a base station device, including:

a searching unit, configured to sequentially search a logic root sequence index occupancy table for several logic root sequence indexes that are not occupied by a neighboring cell, where the number of the several logic root sequence indexes that are not occupied by the neighboring cell is the same as the number of root sequences of a serving cell;

a lookup unit, configured to use each logic root sequence index among the several logic root sequence indexes that are not occupied by the neighboring cell as a lookup parameter, and find several interference coefficients corresponding to each logic root sequence index from a preset interference coefficient table, where an interference coefficient of a sounding reference signal of the neighboring cell for detection of a physical random access channel of the serving cell under a condition that a physical cell identifier of the neighboring cell and each logic root sequence index are given is recorded in the interference coefficient table;

a first determining unit, configured to determine whether an interference coefficient that is greater than an interference coefficient threshold exists among all interference coefficients corresponding to the several logic root sequence indexes that are not occupied by the neighboring cell, where the all interference coefficients are found by the lookup unit; and an outputting unit, configured to, when a determination result of the first determining unit is no, output a first logic root sequence index among the several logic root sequence indexes that are not occupied by the neighboring cell as an initial logic root sequence index of the serving cell, where the several logic root sequence indexes that are not occupied by the neighboring cell are several continuous logic root sequence indexes that are not occupied by the neighboring cell, where the number of the several continuous logic root sequence indexes that are not occupied by the neighboring cell is the same as the number of root sequences of the serving cell.

In another aspect, an embodiment of the present invention provides a base station device, including:

a searching unit, configured to sequentially search a physical cell identifier occupancy table for a physical cell identifier that is not occupied by a neighboring cell;

a lookup unit, configured to use the physical cell identifier that is not occupied by the neighboring cell as a lookup parameter, and find several interference coefficients corresponding to the physical cell identifier that is not occupied by the neighboring cell from a preset interference coefficient table, where an interference coefficient of a sounding reference signal of a serving cell for detection of a physical random access channel of the neighboring cell under a condition that a logic root sequence index of the neighboring cell and the physical cell identifier that is not occupied by the neighboring cell are given is recorded in the interference coefficient table;

a first determining unit, configured to determine whether an interference coefficient that is greater than an interference coefficient threshold exists among all interference coefficients corresponding to the physical cell identifier that is not occupied by the neighboring cell, where the all interference coefficients are found by the lookup unit; and an outputting unit, configured to, when a determination result of the first determining unit is no, output the physical cell identifier that is not occupied by the neighboring cell as a physical cell identifier of the serving cell.

In the embodiments of the present invention, when an LRSI of a serving cell is configured, the influence of a PCI of a neighboring cell is considered, so that under a condition that the PCI of the neighboring cell and each LRSI among several LRSIs that are not occupied by the neighboring cell are given, none of interference coefficients of an SRS of the neighboring cell for detection of a PRACH of the serving cell is greater than an interference coefficient threshold, thereby reducing the influence of the SRS of the neighboring cell on the detection of the PRACH of the serving cell, decreasing false detection of the PRACH of the serving cell, and decreasing a false random access alarm of the serving cell.

In the embodiments of the present invention, when a PCI of a serving cell is configured, the influence of an LRSI of a neighboring cell is considered, so that under a condition that the LRSI of the neighboring cell and a PCI that is not occupied by the neighboring cell are given, none of interference coefficients of an SRS of the serving cell for detection of a PRACH of the neighboring cell is greater than an interference coefficient threshold, thereby reducing the influence of the SRS of the serving cell on the detection of the PRACH of the neighboring cell, decreasing false detection of the PRACH of the neighboring cell, and decreasing a false random access alarm of the neighboring cell.

BRIEF DESCRIPTION OF DRAWINGS

To describe the technical solutions in the embodiments of the present invention more clearly, the accompanying drawings required for describing the embodiments are introduced briefly in the following. Apparently, the accompanying drawings in the following description show only some embodiments of the present invention, and persons of ordinary skill in the art may also derive other drawings from these accompanying drawings without creative efforts.

DESCRIPTION OF EMBODIMENTS

The technical solutions in the embodiments of the present invention are clearly described in the following with reference to the accompanying drawings in the embodiments of the present invention. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

The embodiments of the present invention provide a physical cell identifier configuration method, a logic root sequence index configuration method, and a base station, so that a false random access alarm may be decreased. Details are described in the following.

Embodiment 1

Figure 1:
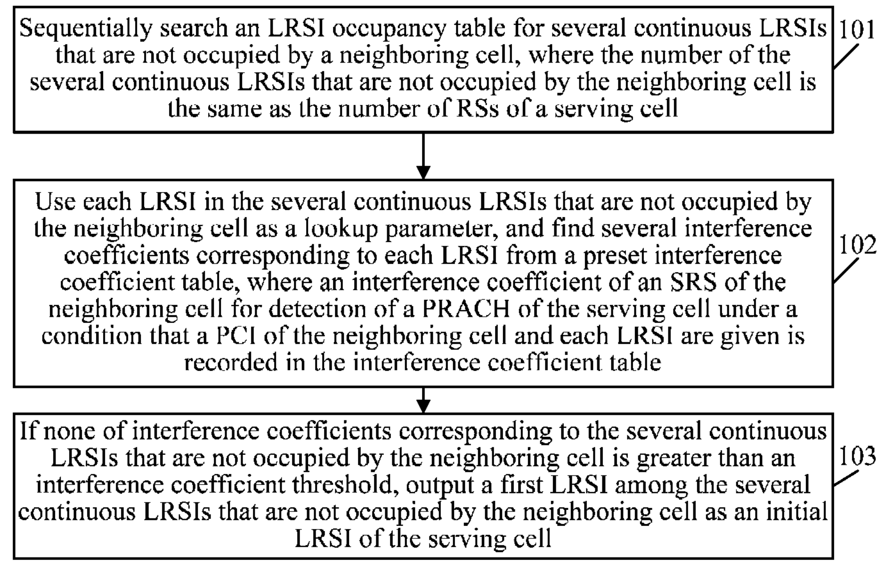
FIG. 1 and FIG. 2 are flow charts of two logic root sequence index configuration methods according to embodiments of the present invention.

Referring to FIG. 1, FIG. 1 is a flow chart of a logic root sequence index configuration method according to an embodiment of the present invention. The logic root sequence index configuration method shown in FIG. 1 may be applied to an LTE system, an enhanced LTE system, or the like, which is not limited in the embodiment of the present invention. As shown in FIG. 1, the logic root sequence index configuration method may include the following steps:

101: Sequentially search an LRSI occupancy table for several continuous LRSIs that are not occupied by a neighboring cell, where the number of the several continuous LRSIs that are not occupied by the neighboring cell is the same as the number of RSs of a serving cell.

The number of the RSs of the serving cell can be obtained through calculation according to the radius of the serving cell, which is a common sense well known by persons skilled in the art and is not described in detail in the embodiment of the present invention.

In the embodiment of the present invention, how to generate the LRSI occupancy table in step 101 is described in detail with reference to a specific embodiment subsequently.

102: Use each LRSI in the several continuous LRSIs that are not occupied by the neighboring cell as a lookup parameter, and find several interference coefficients corresponding to each LRSI from a preset interference coefficient table, where an interference coefficient of an SRS of the neighboring cell for detection of a PRACH of the serving cell under a condition that a PCI of the neighboring cell and each LRSI are given is recorded in the interference coefficient table.

In the embodiment of the present invention, a form of the interference coefficient table in step 102 is described in detail with reference to a specific embodiment subsequently.

103: If none of interference coefficients corresponding to the several continuous LRSIs that are not occupied by the neighboring cell is greater than an interference coefficient threshold, output a first LRSI among the several continuous LRSIs that are not occupied by the neighboring cell as an initial LRSI of the serving cell.

If none of the interference coefficients corresponding to the several continuous LRSIs that are not occupied by the neighboring cell is greater than the interference coefficient threshold, it indicates that when the serving cell uses the first LRSI among the several continuous LRSIs that are not occupied by the neighboring cell as the initial LRSI, an SRS of any neighboring cell does not influence the detection of the PRACH of the serving cell, and a false random access alarm of the serving cell is not caused.

In Embodiment 1 of the present invention, when an LRSI of a serving cell is configured, the influence of a PCI of a neighboring cell is considered, so that under a condition that the PCI of the neighboring cell and each LRSI among several continuous LRSIs that are not occupied by the neighboring cell are given, none of interference coefficients of an SRS of the neighboring cell for detection of a PRACH of the serving cell is greater than an interference coefficient threshold, thereby reducing the influence of the SRS of the neighboring cell on the detection of the PRACH of the serving cell, decreasing false detection of the PRACH of the serving cell, and decreasing a false random access alarm of the serving cell.

Embodiment 2

Figure 2:
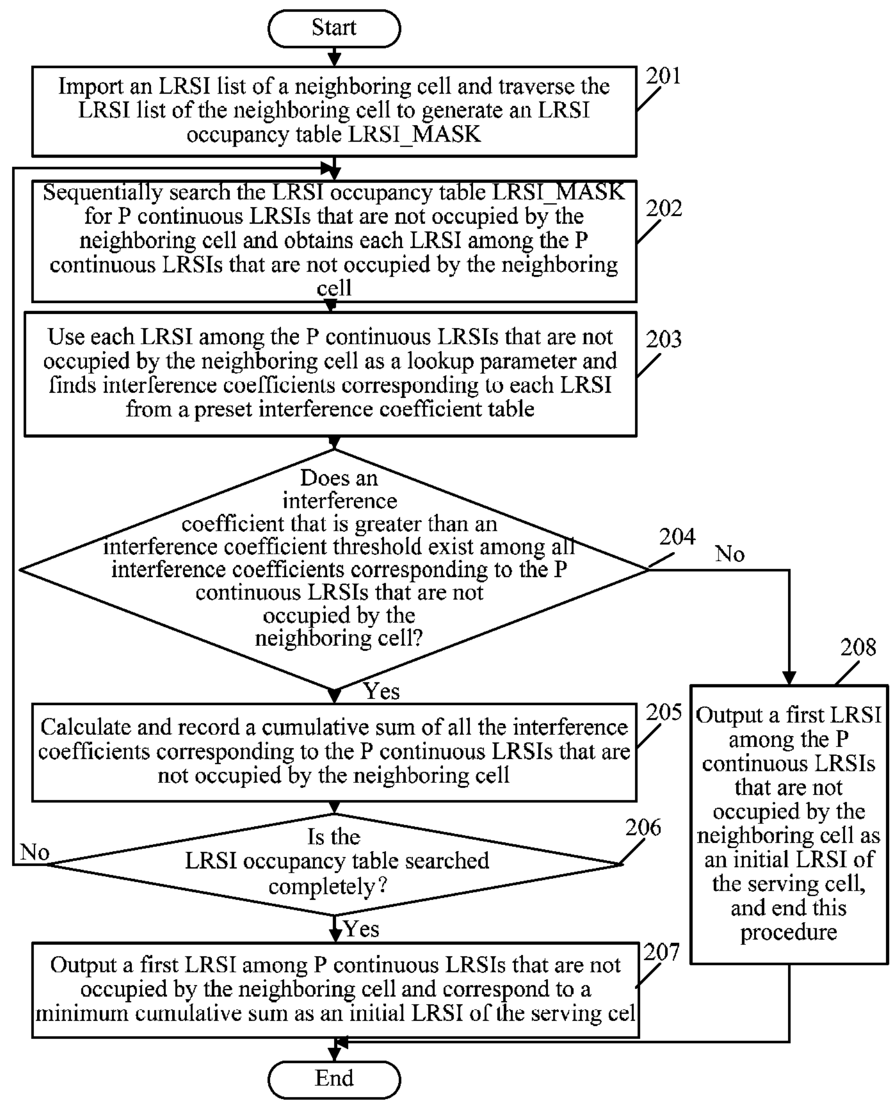

Referring to FIG. 2, FIG. 2 is a flow chart of another logic root sequence index configuration method according to an embodiment of the present invention. In Embodiment 2 of the present invention, an LTE system is taken as an example. The logic root sequence index configuration method provided in the embodiment of the present invention is described from the perspective of a serving cell base station. As shown in FIG. 2, the logic root sequence index configuration method may include the following steps:

201: A serving cell base station imports an LRSI list of a neighboring cell and traverses the LRSI list of the neighboring cell to generate an LRSI occupancy table LRSI_MASK.

The serving cell base station may first calculate, according to the radius of a serving cell, the number of RSs required by the serving cell, so as to learn how many LRSIs the serving cell requires.

It is assumed that the serving cell requires P (P≥1) LRSIs. An LRSI list LRS_TBL of the neighboring cell imported by the serving cell base station is a two-dimensional array, where a first dimension represents a neighboring cell index and a second dimension represents a neighboring cell LRSI index. It is assumed that N neighboring cells exist in total and the numbers of LRSIs of the neighboring cells form an array M, the serving cell base station may generate the LRSI occupancy table LRSI_MASK by traversing the LRS_TBL of the neighboring cell. As an optional implementation manner, the serving cell base station may generate the LRSI occupancy table LRSI_MASK by using the following software program:

```
for i = 0;i < 838;++
LRSI_MASK(i)= 0
end
for i = 0;i < N; i ++
for j=0;j<M(i);j++
LRSI_MASK(LRS_TBL(i)(j)))= 1;
end
end
```

In the embodiment of the present invention, the serving cell base station may determine a neighboring cell according to parameters such as a physical distance and an antenna coverage direction.

202: The serving cell base station sequentially searches the LRSI occupancy table LRSI_MASK for P continuous LRSIs that are not occupied by the neighboring cell and obtains each LRSI among the P continuous LRSIs that are not occupied by the neighboring cell.

As an optional implementation manner, the serving cell base station may sequentially search for the P continuous LRSIs that are not occupied by the neighboring cell and obtain each LRSI among the P continuous LRSIs that are not occupied by the neighboring cell by using the following software program:

```
for i = 0;i < 838; i++
for j=0;j<P;j ++
if 1==LRSI_MASK(i+j)
break
```

-continued

```
            end
        end
        if P == j
            LRSI_Output = i;
            break;
        end
    end
```

203: The serving cell base station uses each LRSI among the P continuous LRSIs that are not occupied by the neighboring cell as a lookup parameter and finds interference coefficients corresponding to each LRSI from a preset interference coefficient table, where an interference coefficient of an SRS of the neighboring cell for detection of a PRACH of the serving cell under a condition that a PCI of the neighboring cell and each LRSI are given is recorded in the interference coefficient table.

In the embodiment of the present invention, an interference coefficient table shown in Table 1 may be obtained according to a simulation experiment, where an interference coefficient of an SRS of the neighboring cell for detection of a PRACH of the serving cell under a condition that a PCI of the neighboring cell and each LRSI are given is recorded in the interference coefficient table. A value range of the given PCI of the neighboring cell may be 0 to 503. A value range of the LRSI may be 0 to 837. In Table 1, IN(x,y) represents an interference coefficient of the SRS of the neighboring cell for the detection of the PRACH of the serving cell when that the PCI of the neighboring cell is x and each LRSI is y is given. It can be known through the simulation experiment that, when 0≤IN(x,y)<1, the influence of the SRS of the neighboring cell on the detection of the PRACH of the serving cell is relatively small, and the serving cell base station does not generate a false random access alarm; and when IN(x,y)>1, the influence of the SRS of the neighboring cell on the detection of the PRACH of the serving cell is relatively large, and the serving cell base station generates a false random access alarm, where 1 indicates an interference coefficient threshold of the SRS of the neighboring cell for the detection of the PRACH of the serving cell. According to an actual requirement, the interference coefficient threshold of the SRS of the neighboring cell for the detection of the PRACH of the serving cell may also be set to another value, which is not limited in the embodiment of the present invention.

TABLE 1

| | LRSI | | | | | |
|---|---|---|---|---|---|---|
| PCI | 0 | 1 | 2 | . . . | 836 | 837 |
| 0 | IN(0,0) | IN(0,1) | IN(0,2) | . . . | IN(0,836) | IN(0,837) |
| 1 | IN(1,0) | IN(1,1) | IN(1,2) | . . . | IN(1,836) | IN(1,837) |
| 2 | IN(2,0) | IN(2,1) | IN(2,2) | . . . | IN(2,836) | IN(2,837) |
| . . . | . . . | . . . | . . . | . . . | . . . | . . . |
| 502 | IN(502,0) | IN(502,1) | IN(502,2) | . . . | IN(502,836) | IN(502,837) |
| 503 | IN(503,0) | IN(503,1) | IN(503,2) | . . . | IN(503,836) | IN(503,837) |

For example, it is assumed that a first LRSI among the P continuous LRSIs that are not occupied by the neighboring cell is 0, the serving cell base station may use "LRSI=0" as a lookup parameter, and may find interference coefficients IN(0,0), IN(1,0), IN(2,0) . . . IN(503,0) corresponding to "LRSI=0" from the interference coefficient table shown in Table 1. For another example, it is assumed that another LRSI among the P continuous LRSIs that are not occupied by the neighboring cell is 1, "LRSI=1" may be used as a lookup parameter, and interference coefficients IN(0,1), IN(1,1), IN(2,1) . . . IN(503,1) corresponding to "LRSI=1" may be found from the interference coefficient table shown in Table 1.

204: The serving cell base station determines whether an interference coefficient that is greater than an interference coefficient threshold exists among all interference coefficients corresponding to the P continuous LRSIs that are not occupied by the neighboring cell; if yes, executes step 205; and if no, executes step 208 and ends this procedure.

If an interference coefficient that is greater than an interference coefficient threshold exists among all interference coefficients corresponding to the P continuous LRSIs that are not occupied by the neighboring cell, it indicates that when the serving cell uses a first LRSI among the P continuous LRSIs that are not occupied by the neighboring cell as an initial LRSI, an SRS of at least one neighboring cell influences the detection of the PRACH of the serving cell, and a false random access alarm of the serving cell is possibly caused.

205: The serving cell base station calculates and records a cumulative sum of all the interference coefficients corresponding to the P continuous LRSIs that are not occupied by the neighboring cell and executes step 206.

206: The serving cell base station determines whether the LRSI occupancy table is searched completely; if no, returns to step 202; and if yes, executes step 207.

If in step 206, the serving cell base station determines that the LRSI occupancy table is not searched completely, the serving cell base station may return to step 202 to continue to sequentially search the LRSI occupancy table for another P continuous LRSIs that are not occupied by the neighboring cell.

207: The serving cell base station outputs a first LRSI among P continuous LRSIs that are not occupied by the neighboring cell and correspond to a minimum cumulative sum as an initial LRSI of the serving cell, and ends this procedure.

For example, it is assumed that an LRSI among P continuous LRSIs that are not occupied by the neighboring cell is 0 and the serving cell base station uses "LRSI=0" as a lookup parameter and finds interference coefficients IN(0,0), IN(1,0), IN(2,0) IN(503,0) corresponding to "LRSI=0" from the interference coefficient table shown in Table 1, but among all the interference coefficients IN(0,0), IN(1,0), IN(2,0) IN(503,0) corresponding to "LRSI=0", at least one interference coefficient is greater than the interference coefficient threshold, the serving cell base station may calculate and record a cumulative sum S of all the interference coefficients corresponding to the P continuous LRSIs that are not occupied by the neighboring cell. It is further assumed that an LRSI among another P continuous LRSIs that are not occupied by the neighboring cell is 836 and the serving cell base station uses "LRSI=836" as a lookup parameter and finds interference coefficients (0,836), IN(1, 836), IN(2,836) . . . IN(503,836) corresponding to "LRSI=836" from the interference coefficient table shown in Table 1, but in all the interference coefficients IN(0,836), IN(1,836), IN(2,836) . . . IN(503,836) corresponding to "LRSI=836", at least one interference coefficient is greater than the interference coefficient threshold, the serving cell base station may calculate and record a cumulative sum S' of all the interference coefficients corresponding to the P continuous LRSIs that are not occupied by the neighboring cell. If S'>S and the serving cell base station determines that the LRSI occupancy table is searched completely, the serving cell base station may use "LRSI=0" among the P continuous LRSIs that are not occupied by the neighboring cell and correspond to S as an initial LRSI of the serving cell. In this way, the influence of the SRS of the neighboring cell on the detection of the PRACH of the serving cell can be reduced to the greatest extent, so that false detection of the PRACH of the serving cell is decreased and a false random access alarm of the serving cell is decreased.

208: The serving cell base station outputs a first LRSI among the P continuous LRSIs that are not occupied by the neighboring cell as an initial LRSI of the serving cell, and ends this procedure.

In Embodiment 2 of the present invention, when a serving cell base station configures an LRSI of a serving cell, the influence of a PCI of a neighboring cell is considered, so that under a condition that the PCI of the neighboring cell and each LRSI among several continuous LRSIs that are not occupied by the neighboring cell are given, none of interference coefficients of an SRS of the neighboring cell for detection of a PRACH of the serving cell is greater than an interference coefficient threshold, thereby reducing the influence of the SRS of the neighboring cell on the detection of the PRACH of the serving cell, decreasing false detection of the PRACH of the serving cell, and decreasing a false random access alarm of the serving cell.

Embodiment 3

Figure 3:
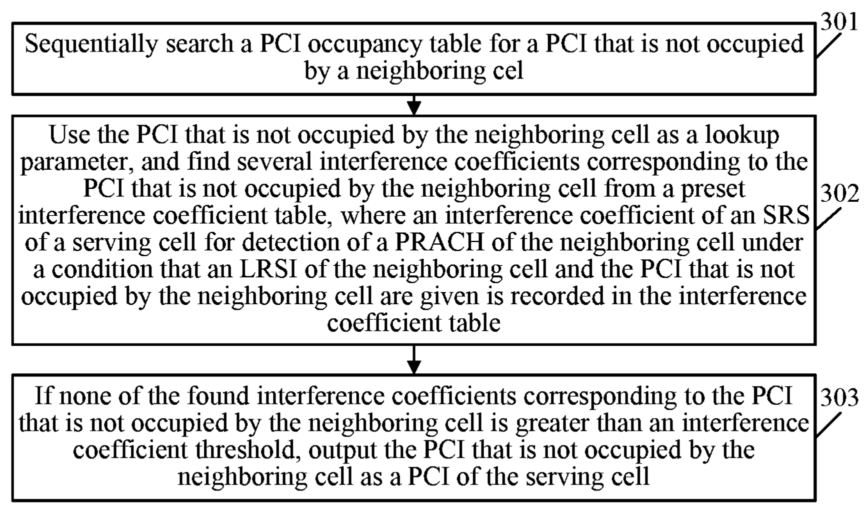
FIG. 3 and FIG. 4 are flow charts of two physical cell identifier configuration methods according to embodiments of the present invention.

Referring to FIG. 3, FIG. 3 is a flow chart of a physical cell identifier configuration method according to an embodiment of the present invention, which is applied to an LTE system. As shown in FIG. 3, the physical cell identifier configuration method may include the following steps:

301: Sequentially search a PCI occupancy table for a PCI that is not occupied by a neighboring cell.

In the embodiment of the present invention, how to generate the PCI occupancy table in step 301 is described in detail with reference to a specific embodiment subsequently.

302: Use the PCI that is not occupied by the neighboring cell as a lookup parameter, and find several interference coefficients corresponding to the PCI that is not occupied by the neighboring cell from a preset interference coefficient table, where an interference coefficient of an SRS of a serving cell for detection of a PRACH of the neighboring cell under a condition that an LRSI of the neighboring cell and the PCI that is not occupied by the neighboring cell are given is recorded in the interference coefficient table.

In the embodiment of the present invention, the interference coefficient table in step 302 may be similar to Table 1. For example, it is assumed that, in step 301, the PCI that is not occupied by the neighboring cell and obtained by sequentially searching the PCI occupancy table is 0, "PCI=0" may be used as a lookup parameter, and interference coefficients IN(0,0), IN(0,1), IN(0,2) . . . IN(0,837) corresponding to "PCI=0" are found from the interference coefficient table shown in Table 1.

303: If none of the found interference coefficients corresponding to the PCI that is not occupied by the neighboring cell is greater than an interference coefficient threshold, output the PCI that is not occupied by the neighboring cell as a PCI of the serving cell.

If none of the found interference coefficients corresponding to the PCI that is not occupied by the neighboring cell is greater than the interference coefficient threshold, it indicates that when the serving cell uses the PCI that is not occupied by the neighboring cell as the PCI of the serving cell, the SRS of the serving cell does not influence detection of a PRACH of any neighboring cell, and a false random access alarm of any neighboring cell is caused.

In Embodiment 3 of the present invention, when a PCI of a serving cell is configured, the influence of an LRSI of a neighboring cell is considered, so that under a condition that the LRSI of the neighboring cell and a PCI that is not occupied by the neighboring cell are given, none of interference coefficients of an SRS of the serving cell for detection of a PRACH of the neighboring cell is greater than an interference coefficient threshold, thereby reducing the influence of the SRS of the serving cell on the detection of the PRACH of the neighboring cell, decreasing false detection of the PRACH of the neighboring cell, and decreasing a false random access alarm of the neighboring cell.

Embodiment 4

Figure 4:
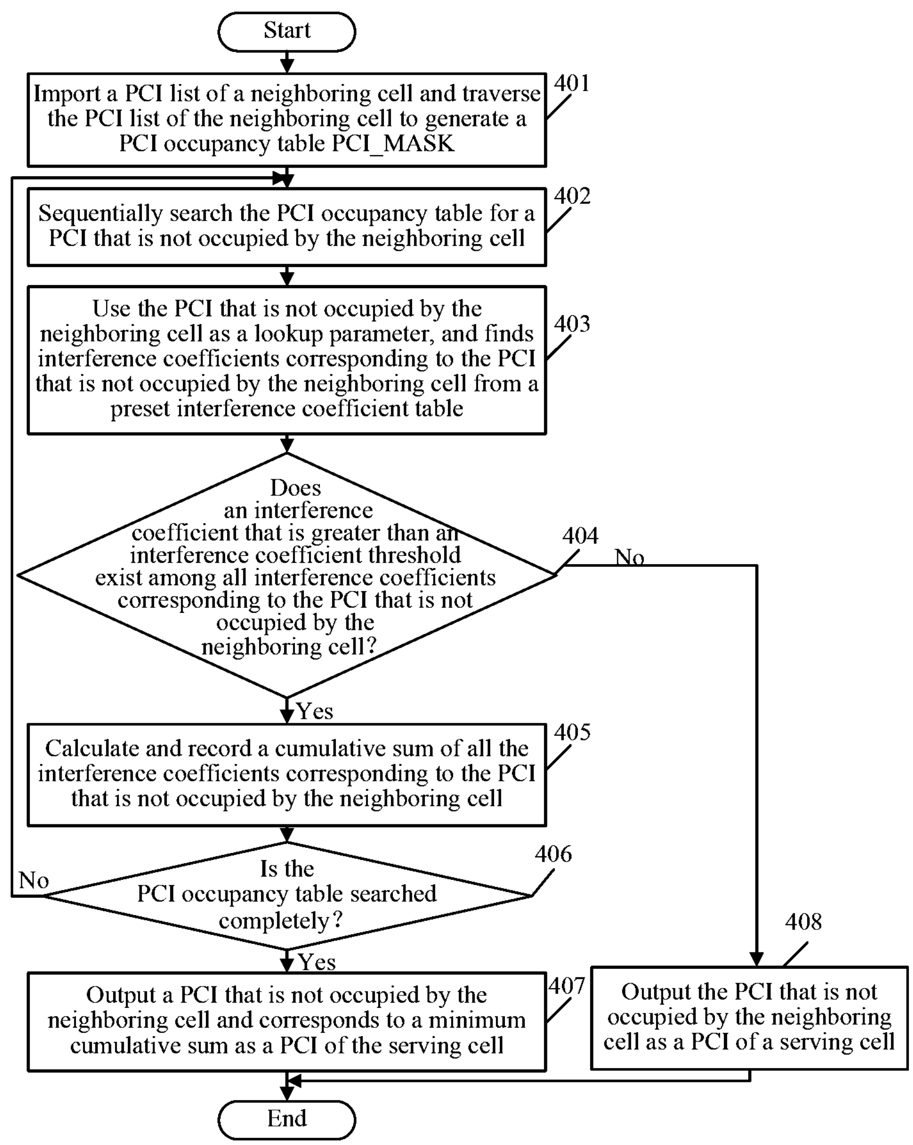

Referring to FIG. 4, FIG. 4 is a flow chart of another physical cell identifier configuration method according to an embodiment of the present invention. In Embodiment 4 of the present invention, an LTE system is taken as an example. The physical cell identifier configuration method provided in the embodiment of the present invention is described from the perspective of a serving cell base station. As shown in FIG. 4, the physical cell identifier configuration method may include the following steps:

401: A serving cell base station imports a PCI list of a neighboring cell and traverses the PCI list of the neighboring cell to generate a PCI occupancy table PCI_MASK.

A PCI list PCI_TBL of the neighboring cell imported by the serving cell base station is a one-dimensional array. It is assumed that N neighboring cells exist in total, the serving cell base station may generate the PCI occupancy table PCI_MASK by using the following software program:

```
for i = 0; i < 504; i ++
PCI_MASK(i) = 0
end
for i = 0; i < N; i ++
PCI_MASK(PCI_TBL (i)) = 1;
end
```

402: The serving cell base station sequentially searches the PCI occupancy table for a PCI that is not occupied by the neighboring cell.

As an optional implementation manner, the serving cell base station may sequentially search the PCI occupancy table PCI_MASK for the PCI that is not occupied by the neighboring cell by using the following software program:

```
for i = 0; i < 504; i ++
if 0 == PCI_MASK(i)
```

-continued

```
PCI_Output = i;
break;
end
end
```

403: The serving cell base station uses the PCI that is not occupied by the neighboring cell as a lookup parameter, and finds interference coefficients corresponding to the PCI that is not occupied by the neighboring cell from a preset interference coefficient table, where an interference coefficient of an SRS of a serving cell for detection of a PRACH of the neighboring cell under a condition that an LRSI of the neighboring cell and the PCI that is not occupied by the neighboring cell are given is recorded in the interference coefficient table.

404: The serving cell base station determines whether an interference coefficient that is greater than an interference coefficient threshold exists among all found interference coefficients corresponding to the PCI that is not occupied by the neighboring cell; if yes, executes step 405; and if no, executes step 408 and ends this procedure.

If an interference coefficient that is greater than an interference coefficient threshold exists among all found interference coefficients corresponding to the PCI that is not occupied by the neighboring cell, it indicates that when the serving cell uses the PCI that is not occupied by the neighboring cell as a PCI of the serving cell, an SRS of the serving cell influences detection of a PRACH of at least one neighboring cell, and a false random access alarm of the neighboring cell is caused.

405: The serving cell base station calculates and records a cumulative sum of all the interference coefficients corresponding to the PCI that is not occupied by the neighboring cell and executes step 406.

406: The serving cell base station determines whether the PCI occupancy table is searched completely; if no, returns to step 402; and if yes, executes step 407.

If in step 406, the serving cell base station determines that the PCI occupancy table is not searched completely, the serving cell base station may return to step 402 to continue to sequentially search the PCI occupancy table for a next PCI that is not occupied by the neighboring cell.

407: The serving cell base station outputs a PCI that is not occupied by the neighboring cell and corresponds to a minimum cumulative sum as a PCI of the serving cell, and ends this procedure.

408: Output the PCI that is not occupied by the neighboring cell as a PCI of the serving cell.

In Embodiment 4 of the present invention, when a PCI of a serving cell is configured, the influence of an LRSI of a neighboring cell is considered, so that under a condition that the LRSI of the neighboring cell and a PCI that is not occupied by the neighboring cell are given, none of interference coefficients of an SRS of the serving cell for detection of a PRACH of the neighboring cell is greater than an interference coefficient threshold, thereby reducing the influence of the SRS of the serving cell on the detection of the PRACH of the neighboring cell, decreasing false detection of the PRACH of the neighboring cell, and decreasing a false random access alarm of the neighboring cell.

Embodiment 5

Figure 5:
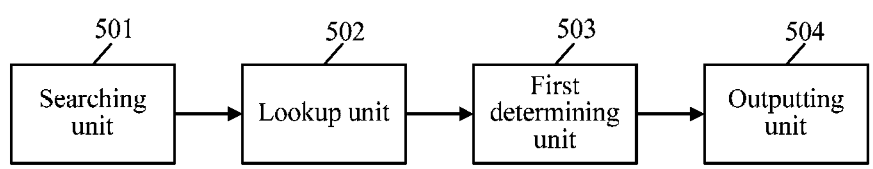
FIG. 5 to FIG. 8 are structural diagrams of several base station devices according to embodiments of the present invention.

Referring to FIG. 5, FIG. 5 is a structural diagram of a base station device according to an embodiment of the present invention, which can implement a logic root sequence index configuration function. The base station device shown in FIG. 5 may be applied to an LTE system, an enhanced LTE system, or the like, which is not limited in the embodiment of the present invention. As shown in FIG. 5, the base station device may includes:

a searching unit 501, configured to search an LRSI occupancy table for several continuous LRSIs that are not occupied by a neighboring cell, where the number of the several continuous LRSIs that are not occupied by the neighboring cell is the same as the number of RSs of a serving cell;

a lookup unit 502, configured to use each LRSI among the several continuous LRSIs that are not occupied by the neighboring cell as a lookup parameter, and find several interference coefficients corresponding to each LRSI from a preset interference coefficient table, where an interference coefficient of an SRS of the neighboring cell for detection of a PRACH of the serving cell under a condition that a PCI of the neighboring cell and each LRSI are given is recorded in the interference coefficient table;

a first determining unit 503, configured to determine whether an interference coefficient that is greater than an interference coefficient threshold exists among all interference coefficients corresponding to the several continuous LRSIs that are not occupied by the neighboring cell, where the all interference coefficients are found by the lookup unit 502; and an outputting unit 504, configured to, when a determination result of the first determining unit is no, output a first LRSI among the several continuous LRSIs that are not occupied by the neighboring cell as an initial LRSI of the serving cell.

Figure 6:
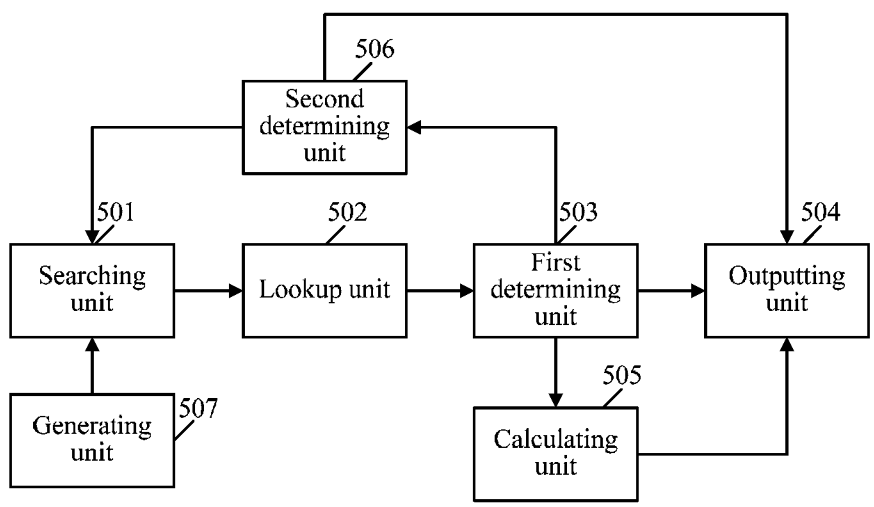

Referring to FIG. 6, FIG. 6 is a structural diagram of another base station device according to an embodiment of the present invention. The base station device shown in FIG. 6 is obtained by optimizing the base station device shown in FIG. 5. Compared with the base station device shown in FIG. 5, the base station device shown in FIG. 6 may further include:

a calculating unit 505, configured to, when the determination result of the first determining unit 503 is yes, calculate and record a cumulative sum of all the interference coefficients corresponding to the several continuous LRSIs that are not occupied by the neighboring cell; and a second determining unit 506, configured to, when the determination result of the first determining unit is yes, determine whether the LRSI occupancy table is traversed completely, and if no, notify the searching unit 501 to sequentially search the LRSI occupancy table for another several continuous LRSIs that are not occupied by the neighboring cell, where correspondingly, the outputting unit 504 is further configured to, when the determination result of the first determining unit 503 is yes and a determination result of the second determining unit 506 is also yes, output a first LRSI among several continuous LRSIs that are not occupied by the neighboring cell and correspond to a minimum cumulative sum as an initial LRSI of the serving cell, and the outputting unit 504 is further configured to, when the determination result of the first determining unit 503 is no and the determination result of the second determining unit 506 is yes, output a first logic root sequence index among several continuous LRSIs that are not occupied by the neighboring cell and correspond to the cumulative sum as an initial LRSI of the serving cell.

As shown in FIG. 6, the base station device may further includes:

a generating unit 507, configured to import an LRSI list of the neighboring cell and traverse the LRSI list of the neighboring cell to generate the LRSI occupancy table.

In Embodiment 5 of the present invention, when a base station device configures an LRSI of a serving cell, the influence of a PCI of a neighboring cell is considered, so that under a condition that the PCI of the neighboring cell and a first LRSI among several continuous LRSIs that are not occupied by the neighboring cell are given, none of interference coefficients of an SRS of the neighboring cell for detection of a PRACH of the serving cell is greater than an interference coefficient threshold, thereby reducing the influence of the SRS of the neighboring cell on the detection of the PRACH of the serving cell, decreasing false detection of the PRACH of the serving cell, and decreasing a false random access alarm of the serving cell.

Embodiment 6

Figure 7:
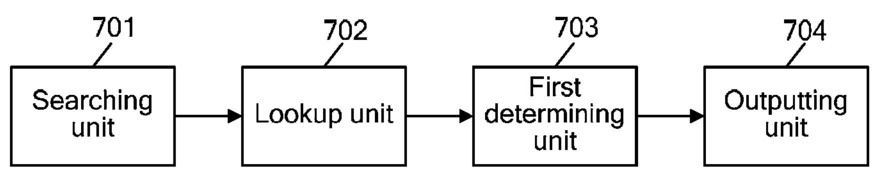

Referring to FIG. 7, FIG. 7 is a structural diagram of a base station device according to an embodiment of the present invention, which can implement a physical cell identifier configuration function. The base station device shown in FIG. 7 may be applied to an LTE system, an enhanced LTE system, or the like, which is not limited in the embodiment of the present invention. As shown in FIG. 7, the base station device may includes:

a searching unit 701, configured to sequentially search a PCI occupancy table for a PCI that is not occupied by a neighboring cell;

a lookup unit 702, configured to use the PCI that is not occupied by the neighboring cell as a lookup parameter, and find several interference coefficients corresponding to the PCI that is not occupied by the neighboring cell from a preset interference coefficient table, where an interference coefficient of an SRS of a serving cell for detection of a PRACH of the neighboring cell under a condition that an LRSI of the neighboring cell and the PCI that is not occupied by the neighboring cell are given is recorded in the interference coefficient table;

a first determining unit 703, configured to determine whether an interference coefficient that is greater than an interference coefficient threshold exists among all interference coefficients corresponding to the PCI that is not occupied by the neighboring cell, where the all interference coefficients are found by the lookup unit 702; and an outputting unit 704, configured to, when a determination result of the first determining unit is no, output the PCI that is not occupied by the neighboring cell as a PCI of the serving cell.

Figure 8:
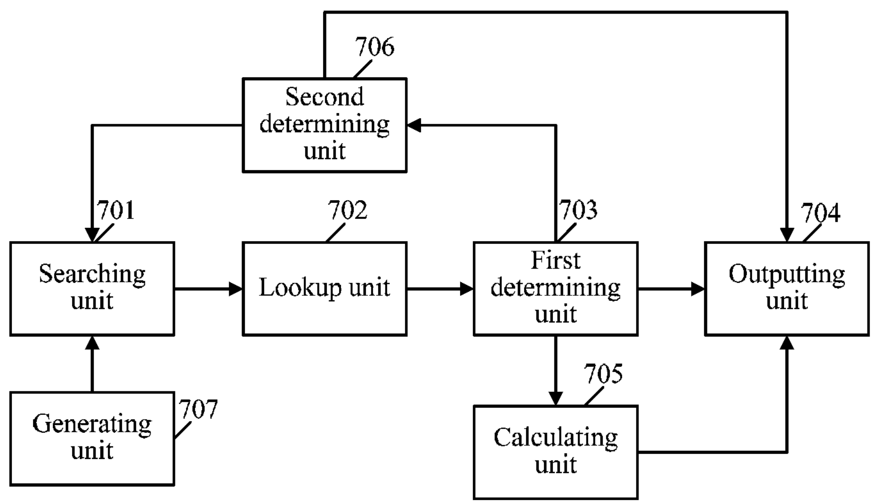

Referring to FIG. 8, FIG. 8 is a structural diagram of another base station device according to an embodiment of the present invention. The base station device shown in FIG. 8 is obtained by optimizing the base station device shown in FIG. 7. Compared with the base station device shown in FIG. 7, the base station device shown in FIG. 8 may further include:

a calculating unit 705, configured to, when the determination result of the first determining unit 703 is yes, calculate and record a cumulative sum of all the interference coefficients corresponding to the PCI that is not occupied by the neighboring cell; and a second determining unit 706, configured to, when the determination result of the first determining unit 703 is yes, determine whether the PCI occupancy table is traversed completely, and if no, notify the searching unit 701 to sequentially search the PCI occupancy table for a next PCI that is not occupied by the neighboring cell, where correspondingly, the outputting unit 704 is further configured to, when the determination result of the first determining unit 703 is yes and a determination result of the second determining unit 706 is also yes, output a PCI that is not occupied by the neighboring cell and corresponds to a minimum cumulative sum as a PCI of the serving cell, and the outputting unit 704 is further configured to, when the determination result of the first determining unit 703 is no and the determination result of the second determining unit 706 is yes, output a PCI that is not occupied by the neighboring cell and corresponds to the cumulative sum as a PCI of the serving cell.

As shown in FIG. 8, the base station device may further includes:

a generating unit 707, configured to import a PCI list of the neighboring cell and traverse the PCI list of the neighboring cell to generate the PCI occupancy table.

In Embodiment 6 of the present invention, when a base station device configures a PCI of a serving cell, the influence of an LRSI of a neighboring cell is considered, so that under a condition that the LRSI of the neighboring cell and a PCI that is not occupied by the neighboring cell are given, none of interference coefficients of an SRS of the serving cell for detection of a PRACH of the neighboring cell is greater than an interference coefficient threshold, thereby reducing the influence of the SRS of the serving cell on the detection of the PRACH of the neighboring cell, decreasing false detection of the PRACH of the neighboring cell, and decreasing a false random access alarm of the neighboring cell.

Persons of ordinary skill in the art may understand that all or part of the steps of the methods according to the foregoing embodiments may be implemented by a program instructing relevant hardware. The program may be stored in a computer readable storage medium. The storage medium may include a flash disk, a read-only memory (Read-Only Memory, ROM), a random access memory (Random Access Memory, RAM), a magnetic disk, or an optical disk.

An embodiment of the present invention further provides a logic root sequence index configuration method, including:

sequentially searching a logic root sequence index occupancy table for several logic root sequence indexes that are not occupied by a neighboring cell;

using each logic root sequence index among the several logic root sequence indexes that are not occupied by the neighboring cell as a lookup parameter, and finding several interference coefficients corresponding to each logic root sequence index from a preset interference coefficient table, where an interference coefficient of a sounding reference signal of the neighboring cell for detection of a physical random access channel of a serving cell under a condition that a physical cell identifier of the neighboring cell and each logic root sequence index are given is recorded in the interference coefficient table; and if none of interference coefficients corresponding to the several logic root sequence indexes that are not occupied by the neighboring cell is greater than an interference coefficient threshold, outputting a first logic root sequence index among the several logic root sequence indexes that are not occupied by the neighboring cell as an initial logic root sequence index of the serving cell, where the several logic root sequence indexes that are not occupied by the neighboring cell are several continuous logic root sequence indexes that are not occupied by the neighboring cell, where the number of the several continuous logic root sequence indexes that are not occupied by the neighboring cell is the same as the number of root sequences of the serving cell.

An embodiment of the present invention further provides a base station device, including:

a searching unit, configured to sequentially search a logic root sequence index occupancy table for several logic root sequence indexes that are not occupied by a neighboring cell;

a lookup unit, configured to use each logic root sequence index among the several logic root sequence indexes that are not occupied by the neighboring cell as a lookup parameter, and find several interference coefficients corresponding to each logic root sequence index from a preset interference coefficient table, where an interference coefficient of a sounding reference signal of the neighboring cell for detection of a physical random access channel of a serving cell under a condition that a physical cell identifier of the neighboring cell and each logic root sequence index are given is recorded in the interference coefficient table;

a first determining unit, configured to determine whether an interference coefficient that is greater than an interference coefficient threshold exists among all interference coefficients corresponding to the several logic root sequence indexes that are not occupied by the neighboring cell, where the all interference coefficients are found by the lookup unit; and an outputting unit, configured to, when a determination result of the first determining unit is no, output a first logic root sequence index among the several logic root sequence indexes that are not occupied by the neighboring cell as an initial logic root sequence index of the serving cell, where the several logic root sequence indexes that are not occupied by the neighboring cell are several continuous logic root sequence indexes that are not occupied by the neighboring cell, where the number of the several continuous logic root sequence indexes that are not occupied by the neighboring cell is the same as the number of root sequences of the serving cell.

The PCI configuration method, the LRSI configuration method, and the base station device provided in the embodiments of the present invention are described in detail in the foregoing. In this specification, a principle and an implementation manner of the present invention are described by using specific examples. The description of the foregoing embodiments is only provided for helping understand the method and core ideas of the present invention. Meanwhile, persons of ordinary skill in the art may make variations to a specific implementation manner and an application scope according to the ideas of the present invention. Therefore, content of the specification shall not be construed as a limitation to the present invention.

What is claimed is:

1. A logic root sequence index configuration method for decreasing a false random access alarm of a serving cell in a cellular telecommunications system, the method comprising:

sequentially searching a logic root sequence index occupancy table for a plurality of logic root sequence indexes (LRSIs) that are not occupied by a neighboring cell;

using each logic root sequence index (LRSI) among the plurality of LRSIs as a lookup parameter;

finding a plurality of interference coefficients; wherein, each of the plurality of interference coefficients corresponding to one LRSI from a preset interference coefficient table, wherein the interference coefficient of a sounding reference signal of the neighboring cell is recorded in the interference coefficient table, and the interference coefficient of the sounding reference signal is for detection of a physical random access channel of the serving cell under a condition that a physical cell identifier of the neighboring cell and each LRSI is given; and outputting a first LRSI from among the plurality of LRSIs as an initial LRSI of the serving cell when none of the interference coefficients corresponding to the plurality of LRSIs is greater than an interference coefficient threshold, thereby decreasing the false random access alarm of the serving cell.

2. The method according to claim 1, wherein the plurality of LRSIs that are not occupied by the neighboring cell are the plurality of continuous LRSIs that are not occupied by the neighboring cell, wherein a quantity of the plurality of continuous LRSIs that are not occupied by the neighboring cell is the same as a quantity of the plurality of root sequences of the serving cell.

3. The method according to claim 2, wherein if an interference coefficient that is greater than the interference coefficient threshold exists among each of the plurality of the interference coefficients corresponding to the plurality of LRSIs that are not occupied by the neighboring cell, the method further comprises:

calculating and recording a cumulative sum of each of the plurality of the interference coefficients corresponding to the plurality of LRSIs that are not occupied by the neighboring cell; and if the logic root sequence index occupancy table is not searched completely, sequentially searching the logic root sequence index occupancy table for one of the plurality of LRSIs that are not occupied by the neighboring cell, and executing a step of using each logic root sequence index among the plurality of LRSIs that are not occupied by the neighboring cell as a lookup parameter and finding the one of the plurality of interference coefficients corresponding to each logic root sequence index from the preset interference coefficient table;

outputting a first logic root sequence index among the plurality of LRSIs that are not occupied by the neighboring cell as the initial logic root sequence index of the serving cell until none of the found interference coefficients corresponding to the plurality of LRSIs that are not occupied by the neighboring cell is greater than the interference coefficient threshold; and otherwise, outputting a first logic root sequence index among the plurality of LRSIs that are not occupied by the neighboring cell and correspond to a minimum cumulative sum as the initial logic root sequence index of the serving cell.

4. The method according to claim 1, further comprising:

importing a logic root sequence index list of the neighboring cell; and traversing the logic root sequence index list of the neighboring cell to generate the logic root sequence index occupancy table.

5. The method according to claim 2, further comprising:

importing a logic root sequence index list of the neighboring cell; and traversing the logic root sequence index list of the neighboring cell to generate the logic root sequence index occupancy table.

6. The method according to claim 3, further comprising:

importing a logic root sequence index list of the neighboring cell; and traversing the logic root sequence index list of the neighboring cell to generate the logic root sequence index occupancy table.

7. A base station device comprising a processor and a processor-readable medium having processor-executable instructions stored thereon for decreasing a false random access alarm of a serving cell in a cellular telecommunications system, the processor-executable instructions configuring the processor to:

sequentially search a logic root sequence index occupancy table for a plurality of logic root sequence indexes (LRSIs) that are not occupied by a neighboring cell;

use one logic root sequence index (LRSI) among the plurality of LRSIs as a lookup parameter;

find a plurality of interference coefficients; wherein, each of the plurality of interference coefficients corresponding to one LRSI from a preset interference coefficient table, wherein the interference coefficient of a sounding reference signal of the neighboring cell is recorded in the interference coefficient table, and the coefficient of the sounding reference signal is for detection of a physical random access channel of the serving cell under a condition that a physical cell identifier of the neighboring cell and each LRSI is given;

determine whether an interference coefficient that is greater than an interference coefficient threshold exists among the plurality of interference coefficients corresponding to the plurality of LRSIs that are not occupied by the neighboring cell; and output a first LRSI among the plurality of LRSIs as an initial logic root sequence index of the serving cell when none of the plurality of interference coefficients corresponding to the plurality of LRSIs is greater than an interference coefficient threshold, thereby decreasing the false random access alarm of the serving cell.

8. The base station device according to claim 7, wherein the plurality of LRSIs that are not occupied by the neighboring cell are the plurality of continuous LRSIs that are not occupied by the neighboring cell, wherein a quantity of the plurality of the continuous LRSIs that are not occupied by the neighboring cell is the same as a quantity of the plurality of root sequences of the serving cell.

9. The base station device according to claim 8, wherein when the determination result is yes, the processor is further configured to:

calculate and record a cumulative sum of the plurality of interference coefficients corresponding to the plurality of LRSIs that are not occupied by the neighboring cell;

determine whether the logic root sequence index occupancy table is traversed completely;

if the logic root sequence index occupancy table is not traversed completely, notify the searching unit to sequentially search the logic root sequence index occupancy table for one of the plurality of LRSIs that are not occupied by the neighboring cell; and output a first logic root sequence index among the plurality of LRSIs that are not occupied by the neighboring cell and correspond to a minimum cumulative sum as the initial logic root sequence index of the serving cell when the logic root sequence index occupancy table is traversed completely.

10. The base station device according to claim 7, wherein the processor is further configured to:

import a logic root sequence index list of the neighboring cell and traverse the logic root sequence index list of the neighboring cell to generate the logic root sequence index occupancy table.

11. The base station device according to claim 8, wherein the processor is further configured to:

import a logic root sequence index list of the neighboring cell and traverse the logic root sequence index list of the neighboring cell to generate the logic root sequence index occupancy table.

12. The base station device according to claim 9, wherein the processor is further configured to:

import a logic root sequence index list of the neighboring cell and traverse the logic root sequence index list of the neighboring cell to generate the logic root sequence index occupancy table.

13. A base station device, applied to a long term evolution system and comprising a processor and a processor-readable medium having processor-executable instructions stored thereon for decreasing a false random access alarm of a serving cell in a cellular telecommunications system, the processor-executable instructions configuring the processor to:

sequentially search a physical cell identifier occupancy table for a physical cell identifier that is not occupied by a neighboring cell;

use the physical cell identifier that is not occupied by the neighboring cell as a lookup parameter;

find a plurality of interference coefficients corresponding to the physical cell identifier that is not occupied by the neighboring cell from a preset interference coefficient table, wherein an interference coefficient of a sounding reference signal of the serving cell is recorded in the interference coefficient table, and the interference coefficient of the sounding reference signal is for detection of a physical random access channel of the neighboring cell under a condition that a logic root sequence index of the neighboring cell and the physical cell identifier that is not occupied by the neighboring cell are given;

determine whether an interference coefficient that is greater than an interference coefficient threshold exists among the plurality of interference coefficients corresponding to the physical cell identifier that is not occupied by the neighboring cell; and output the physical cell identifier that is not occupied by the neighboring cell as a physical cell identifier of the serving cell when no interference coefficient is greater than the interference coefficient threshold; thereby, decreasing the false random access alarm of the serving cell.

14. The base station device according to claim 13, when the determination result is yes, the processor is further configured to:

calculate and record a cumulative sum of the plurality of interference coefficients corresponding to the physical cell identifier that is not occupied by the neighboring cell;

determine whether the physical cell identifier occupancy table is traversed completely, and if the physical cell identifier occupancy table is not traversed completely, notify the searching unit to sequentially search the physical cell identifier occupancy table for a next physical cell identifier that is not occupied by the neighboring cell; and output a physical cell identifier that is not occupied by the neighboring cell and corresponds to a minimum cumulative sum as the physical cell identifier of the serving cell when the physical cell identifier occupancy table is traversed completely.

15. The base station device according to claim 13, wherein the processor is further configured to:

import a physical cell identifier list of the neighboring cell and traverse the physical cell identifier list of the neighboring cell to generate the physical cell identifier occupancy table.

16. The base station device according to claim 14, wherein the processor is further configured to:

import a physical cell identifier list of the neighboring cell and traverse the physical cell identifier list of the neighboring cell to generate the physical cell identifier occupancy table.

* * * * *